May 8, 1951 J. N. MARSHALL 2,551,959
PLUNGER POSITIONING DEVICE
Filed July 9, 1945
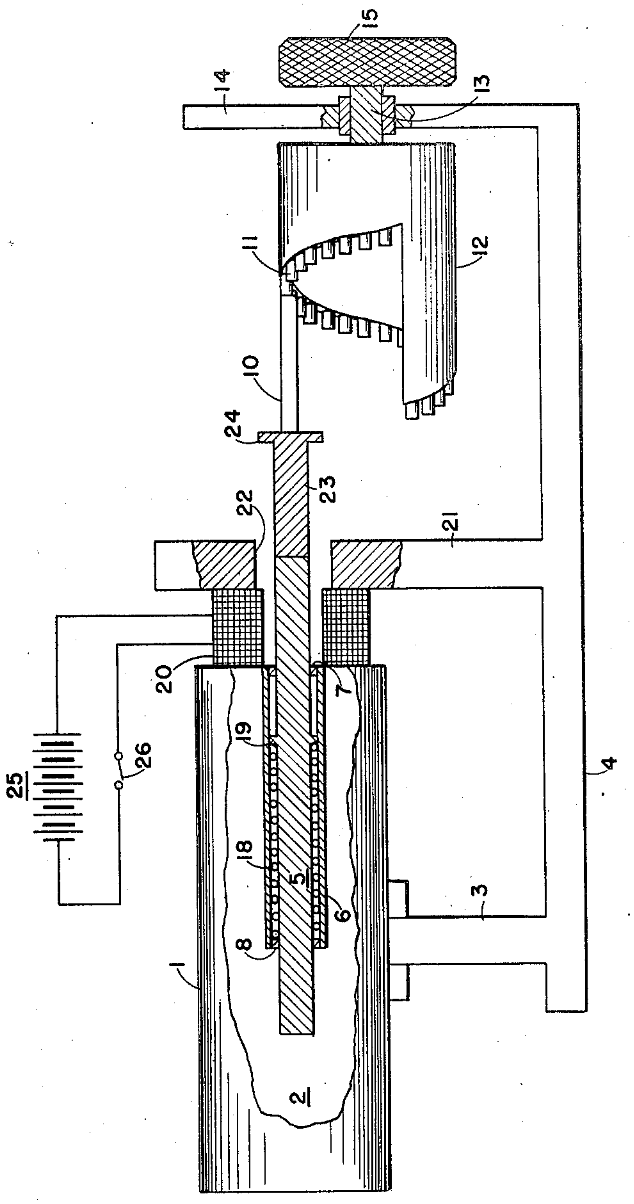
Inventor
JOHN N. MARSHALL
By Ralph L. Chappell
Attorney Patented May 8, 1951

2,551,959

UNITED STATES PATENT OFFICE 2,551,959

PLUNGER POSITIONING DEVICE

John N. Marshall, Washington, D. C., assignor to the Minister of Supply in His Majesty's Government of the United Kingdom of Great Britain and Northern Ireland, London, England Application July 9, 1945, Serial No. 603,937

3 Claims. (Cl. 74—10.15)

This invention relates to plunger positioning devices, and more particularly to a device whereby a longitudinally reciprocable tuning plunger may be selectively moved to a number of accurately predetermined positions.

In certain types of apparatus it may be desirable that a member such as a plunger be movable to a plurality of selectable predetermined positions. For example, in certain types of high frequency electronic equipment one practice is to employ tunable resonant chambers, the frequency of which is varied by moving a tuning plunger further into or out of the chamber. Since the position of the plunger with respect to the chamber determines the resonant frequency of the chamber, it is highly desirable that the position of the plunger be accurately known, and where a plurality of frequencies are to be employed, that the plunger be readily movable to any one of a number of predetermined positions. In some types of apparatus the plunger is moved by a rack and pinion movement, or by a cam. In either case the moving force is applied to a rotatable shaft associated, respectively, with either the pinion or the cam, and it becomes exceedingly difficult to determine precisely the position of the plunger.

An object of the present invention is to provide a new and improved plunger positioning device, and more particularly a device for accurately positioning a tuning plunger at a selected one of a number of predetermined positions.

In accordance with one embodiment of this invention as applied to a longitudinally reciprocable plunger used for tuning a resonant chamber, a plurality of stop members are mounted between two extreme positions on a suitable support adjacent the outer end of the plunger so as to be, in accordance with the position of the stop member support, selectively engageable with the end of the plunger, and in accordance with the stop member engaged the plunger is located at one of a predetermined number of positions. The end of the plunger is urged into engagement with the stop members by a spring associated with the plunger. The plunger may be retracted while the stop member support is adjusted to position a different stop member adjacent the end of the plunger by a solenoid coil associated with the plunger, a portion of the plunger being made of a magnetically susceptible material.

Other objects and advantages of the present invention will be apparent from the following detailed description taken in conjunction with the drawing, wherein the single figure is a side elevational view of a plunger positioning device constructed in accordance with one embodiment of this invention, a portion of the figure being shown in section to facilitate illustration.

While this invention will be discussed and described primarily in conjunction with a device for positioning a tuning plunger associated with a resonant chamber, it will be understood that the invention is equally applicable to any longitudinally reciprocable plunger, the position of which is to be predetermined.

Referring now to the drawings it will be seen that a hollow cylinder 1 is provided, the interior of which forms a resonant chamber 2. For purposes of illustration the cylinder 1 is shown as supported on a bracket 3 the lower end of which is mounted on a base 4 of the apparatus. A longitudinally adjustable plunger 5 is disposed in the cylinder 1 and located substantially along the axis thereof, being supported in the cylinder by a short tube 6, through which the plunger 5 extends. The right end of the tube 6 is mounted on the right end wall, as viewed in this drawing, of the cylinder 1 and the tube is made somewhat larger in diameter than the plunger 5. An annular bearing 7 is mounted in the right end of the tube, while a second annular bearing 8 is mounted in the left end of the tube and these bearings slidably support the plunger 5. The bearings 7 and 8 may be of very simple design such as a collar which extends inwardly to peripherally engage the plunger 5.

By moving the plunger 5 further into the cylinder 1 or away from the cylinder 1 the resonant frequency of the chamber 2 may be varied. In order to predetermine the location of the plunger 5 with respect to the cavity 2, the right end of the plunger, as viewed in this drawing, is provided with an extension 10 which may be of somewhat less cross-sectional size than the plunger 5 and the right end of the extension 10 is selectively engageable wtih one of a plurality of stop members 11 which are mounted on the left edge of a rotatable cylinder 12. The left portion of the cylinder 12 is formed in the shape of a spiral, as shown, so that those stop members located adjacent the base of the spiral will lie in a plane more remote from the cylinder 1 than those stop members adjacent the top of the spiral, and the stop members intermediate the base and top will be progressively nearer the cylinder 1. The stop members may comprise pins which are threaded into the wall of the cylinder 12 and which may be adjusted as desired. The stop members might also comprise simply steps formed in the spiral.

It will be understood that while a cylindrical support has been shown it would be feasible to mount the stop members 11 along the edge of a plate which could be moved longitudinally at right angles to the extension 10 by a rack and pinion, the edge of the plate supporting the stop members being tapered suitably. However, the cylindrical support has been found to be simple and satisfactory.

The cylinder 12 is mounted on a rotatable shaft 13 which is journalled in an upright plate 14, the lower end of which may be mounted on the base 4. The axis of rotation of the shaft 13 is selected so that the stop members 11 will, as the cylinder is rotated, be located adjacent the end of the extension 10. A knob 15, which may be knurled, is mounted on and keyed to the right end of the short shaft 13 to facilitate adjustment of the cylinder 12.

In order to urge the extension 10 into end-on engagement with one of the stop members 11, a helical spring 18 is disposed about the left portion of the plunger 5 and located within the tube 6, the right end of the spring 18 bearing against a flange 19 integrally formed with the plunger, while the left end of the spring bears against the inner side of the bearing 8, thus urging the plunger to the right. Retraction of the plunger 5 is effected by a solenoid coil 20 which is of annular construction, and is disposed about the plunger 5, being mounted on an upright plate 21 which is in turn supported on the base 4, an aperture 22 being formed through the plate 21 to permit the plunger to extend therethrough. A portion 23 of the plunger 5 adjacent the right end thereof is made of a magnetically susceptible material such as iron or steel or a suitable magnetic alloy, while the remainder of the plunger is made of a material which is not magnetically susceptible. This portion 23 is so located that when the end of the extension 10 is engaged with the most remote of the stop members 11, the solenoid coil 20 upon being energized will be able to cause the plunger to move to the left; that is, the portion 23 must be near enough to the coil 20 when the plunger 5 is moved to the right the extreme distance to which it is adjustable so that the magnetic field of the coil 20 will still be sufficient when the coil is energized to pull the portion 23 into the coil. At the same time the coil 20 must be so located that when the coil is energized to move the plunger to the left, the right end of the extension 10 will move slightly further to the left than the end of the stop member 11 nearest to the cylinder 1, thus permitting free rotation of the cylinder 12. A flange 24 may be formed at the right end of the plunger 5 and to serve as a stop to prevent the plunger from moving too far to the left when attracted by the coil, the flange 24 seating against the right end of the coil 20, when the plunger is in fully retracted position. By positioning the stop members 11 more closely together than the width of the end of the extension 10, or by using as hereinbefore suggested steps instead of the stop members 11 so that as the cylinder 12 is rotated in a clockwise direction the end of the extension 10 will leave the surface of one stop member or step and will move outwardly to bear against the surface of the adjacent and more remote stop member or step, it is possible for the plunger to be sequentially moved from the stop members nearer the cylinder to those more remote without retracting the plunger before rotating the cylinder 12. It will be understood, of course, that the plunger must be retracted in order to initially position the extension 10 on the stop member nearest the cylinder 1.

While the cylinder 12 may be rotated through one revolution in a clockwise direction, as viewed in this figure, if the end of the extension 10 is intially positioned against the stop member nearest the cylinder 1, to cause the end of the extension 10 to sequentially engage the several stop members, as just described, in ordinary operation it is desirable that the plunger be movable further into the cavity 2 or away from the cavity 2 at intermediate points and be movable in more than one direction. Thus in employing this device the coil 20 would be energized as from a battery 25 by operating a switch 26 to complete a circuit to the battery 25 each time it is desired to move the plunger further into the cavity and rotation of the cylinder in either direction is possible.

Where herein the various parts of the invention have been referred to as being located in a right or left position, it will be understood that this is done solely for the purpose of facilitating description and that the references relate only to the relative positions of the parts as shown in the accompanying drawing.

While but one embodiment of this invention has been shown and described, it will be understood that many changes and modifications may be made therein without departing from the spirit or scope of the present invention.

What is claimed is:

1. A longitudinally adjustable element movable between two extreme positions, resilient means for urging said element toward one of said extreme positions, a plurality of stop members progressively mounted at different distances from said one extreme position, positioning means for selectively positioning said stop members in the path of movement of said element toward said one extreme position progressively from the stop member more remote from said one extreme position to the stop member less remote from said one extreme position, said positioning means including means spacing the stop members by distances less than the end dimension of the element traversed by the stop members, and means operable to urge said element to the other of said extreme positions for allowing the positioning means to selectively position said stop members in the path of movement of said element toward said one extreme position progressively from the stop member less remote from said one extreme position to the stop member more remote from said one extreme position.

2. An apparatus for selectively positioning a tuning member longitudinally movable between two extreme positions comprising a spring urging said member toward one of said extreme positions, a cylindrical member including a helical edge provided with a plurality of spaced stop members, an axial extension from said member toward said one direction having end dimensions greater than the space between said stop members, means mounting said cylindrical member for rotation relatively to said tuning member so that each of said stop members are locatable in the path of movement of said extension toward said one position in response to rotation of said cylindrical member, means for rotating said cylindrical member for selectively positioning said stop member in said path of said extension progressively from the stop member less remote from said tuning member to the stop member more remote from said tuning member, and solenoid means operable independently of the last-named means and associated with said tuning member for urging said tuning member toward the other of said extreme positions for allowing rotation of said cylindrical member to selectively position said stop members in the path of said extension progressively from the stop member more remote from said tuning member to the stop member less remote from said tuning member.

3. An apparatus for tuning a resonant chamber comprising a tuning member having one end thereof terminated within the chamber, means mounting the tuning member for movement relative to the chamber between positions of maximum and minimum extension of the member within the chamber, resilient means urging the member toward the position of minimum extension, an armature attached to the other end of the member, a plunger extending from the armature axially of the member, a controllable rotatable cylindrical member including a helical wall, means mounting said cylindrical member with respect to said plunger so that a portion of said wall is located in the path of movement of the plunger for all angular positions of said cylindrical member, a plurality of plunger stop members mounted on said helical wall for selectively limiting movement of the member toward the position of minimum extension, and solenoid means cooperating with the armature operative when energized to move the tuning member to the position of maximum extension without the path of the stop members.

JOHN N. MARSHALL.

REFERENCES CITED

The following references are of record in the file of this patent:

UNITED STATES PATENTS

| Number | Name | Date |
|---|---|---|
| 1,965,281 | Deisch | July 3, 1934 |
| 2,051,438 | Dwyer | Aug. 18, 1936 |
| 2,123,978 | Wagner | July 19, 1938 |
| 2,399,701 | White | May 7, 1946 |
| 2,424,506 | Sands | July 22, 1947 |
| 2,426,177 | Carlson et al. | Aug. 26, 1947 |
| 2,435,522 | Wagenknecht | Feb. 3, 1948 |
| 2,453,187 | Blain | Nov. 9, 1948 |

FOREIGN PATENTS

| Number | Country | Date |
|---|---|---|
| 732,417 | France | May 2, 1932 |